(12) United States Patent
Boersma et al.

(10) Patent No.: US 8,346,828 B2
(45) Date of Patent: Jan. 1, 2013

(54) SYSTEM AND METHOD FOR STORING NUMBERS IN FIRST AND SECOND FORMATS IN A REGISTER FILE

(75) Inventors: Maarten Boersma, Holzgerlingen (DE); Michael Kroener, Ehningen (DE); Petra Leber, Ehningen (DE); Silvia M. Mueller, Altdorf (DE); Jochen Preiss, Boeblingen (DE); Kerstin Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 12/250,935

(22) Filed: Oct. 14, 2008

(65) Prior Publication Data

US 2010/0095099 A1  Apr. 15, 2010

(51) Int. Cl.
*G06F 5/00* (2006.01)
(52) U.S. Cl. ..................................... 708/204
(58) Field of Classification Search .................. None
See application file for complete search history.

(56) References Cited

U.S. PATENT DOCUMENTS

| | | | | |
|---|---|---|---|---|
| 5,781,169 A * | 7/1998 | Kuijk et al. | ........ | 345/82 |
| 5,838,750 A * | 11/1998 | Rynaski et al. | ........ | 375/377 |
| 5,889,980 A * | 3/1999 | Smith, Jr. | ........ | 712/222 |
| 6,912,557 B1 * | 6/2005 | North et al. | ........ | 708/490 |
| 7,430,656 B2 * | 9/2008 | Sperber et al. | ........ | 712/221 |
| 7,451,172 B2 | 11/2008 | Powell, Jr. et al. | | |
| 7,974,996 B1 * | 7/2011 | North et al. | ........ | 708/495 |
| 2002/0184282 A1 * | 12/2002 | Yuval et al. | ........ | 708/495 |
| 2006/0184601 A1 | 8/2006 | Trong et al. | | |
| 2009/0210678 A1 | 8/2009 | Ford | | |

OTHER PUBLICATIONS

IBM POWER6 accelerators: VMX and DFU; L. Eisen et al.; IBM J. Res. & Dev. vol. 51 No. 6 Nov. 2007; pp. 1-21.
Advanced virtualization capabilities of POWER5 systems; W.J. Armstrong et al.; IBM J. Res. & Dev. vol. 49 No. 4/5 Jul./Sep. 2005; pp. 523-532.
Power ISA Version 2.05; Oct. 23, 2007; Chapter 4 of Book I, Section 4.2.1, pp. 100-101.
Schmookler, et al., "A Low-Power, High-Speed Implementation of a PowerPC Microprocessor Vector Extension," Computer Arithmetic, 1999. Proceedings 14th IEEE on Computer Arithmetic pp. 12-19.
Trong, et al, "P6 Binary Floating-Point Unit," Computer Arithmetic, 2007 ARITH '07, 18th IEEE Symposium on Computer Aritmetic, presented Jun. 25-27, 2007. pp. 77-86.

* cited by examiner

*Primary Examiner* — David H Malzahn
(74) *Attorney, Agent, or Firm* — Cantor Colburn LLP; Matthew Talpis

(57) ABSTRACT

A system and a method for storing numbers in a register file are provided. The system and the method store single precision numbers in double precision format in a register file that is shared between floating point computational units and computational units not supporting floating point numbers.

20 Claims, 6 Drawing Sheets

SYSTEM AND METHOD FOR STORING NUMBERS IN FIRST AND SECOND FORMATS IN A REGISTER FILE

STATEMENT REGARDING FEDERALLY SPONSORED RESEARCH

This invention was made with Government support under Contract No. HR0011-07-9-0002 awarded by DARPA. The Government has certain rights to this invention.

FIELD OF INVENTION

This application relates to a system and a method for storing numbers in first and second formats in a register file, and in particular, to a system and a method for storing single precision numbers in double precision format in a register file that is shared between floating point computational units and units not supporting floating point numbers.

BACKGROUND OF INVENTION

In one computer system, when functional units in the computer system share a register file, the functional units must store data in a common data format in the register file. However, if a person desires to use two functional units that output different data formats, the two functional units cannot share the register file.

Accordingly, the inventors herein have recognized a need for an improved system and method that minimizes and/or eliminates the above-mentioned deficiency.

SUMMARY OF INVENTION

A system for storing numbers in first and second formats in accordance with an exemplary embodiment is provided. The system includes a register file. The system further includes a first computational unit operably communicating with the register file. The first computational unit is configured to generate a first number having first flag information indicating that the first number is in the first format and to store the first number in the register file. The first computational unit is further configured to generate a second number having second flag information indicating that the second number is in the second format and to store the second number in the register file. The system further includes a second computational unit operably communicating with the register file. The second computational unit is configured to perform operations utilizing numbers in the first format and not configured to perform operations utilizing numbers in the second format. The second computational unit is further configured to read a third number and third flag information from the register file and use the third flag information to determine whether the third number is in the first format or the second format.

A method for storing numbers in first and second formats in accordance with another exemplary embodiment is provided. The method includes generating a first number having first flag information indicating that the first number is in the first format and storing the first number in the register file, utilizing a first computational unit. The method further includes generating a second number having second flag information indicating that the second number is in the second format and storing the second number in the register file, utilizing the first computational unit. The method further includes performing operations utilizing numbers in the first format and not performing operations utilizing numbers in the second format, utilizing a second computational unit. The method further includes reading a third number and third flag information from the register file utilizing the second computational unit and using the third flag information to determine whether the third number is in the first format or the second.

DESCRIPTION OF EXEMPLARY EMBODIMENTS

Figure 1:
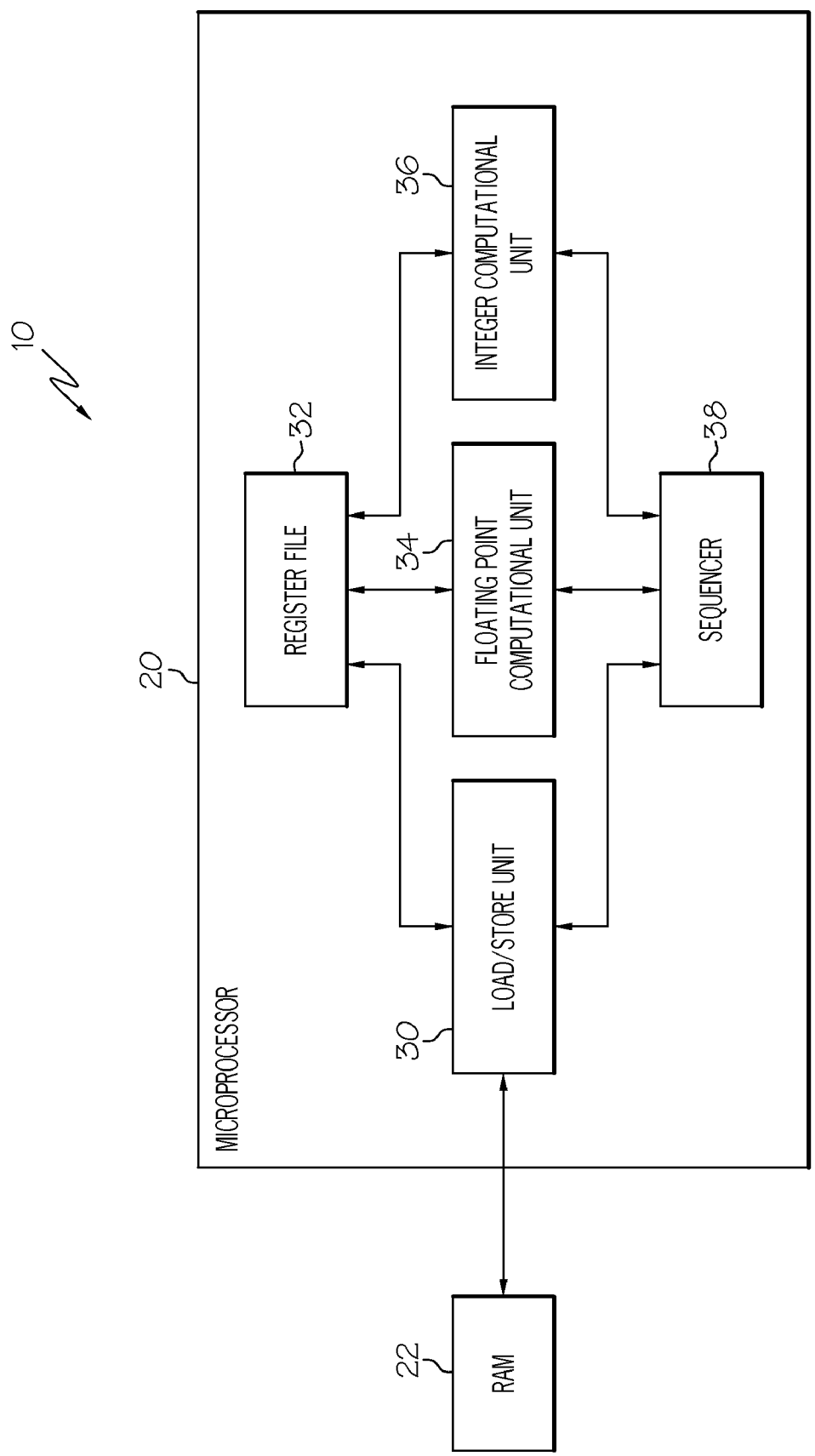
FIG. 1 is a schematic of a system for storing numbers in first and second formats in a register file in accordance with an exemplary embodiment.

Referring to FIG. 1, a system 10 for storing numbers in first and second formats in a register file in accordance with an exemplary embodiment is provided. The system 10 includes a microprocessor 20 and a random access memory (RAM) 22. For purposes of understanding the term "operation" used herein means at least one of: a mathematical operation, a logical operation, and transferring data between different memory locations in one or more memory devices.

The microprocessor 20 is configured to perform operations utilizing numbers. The microprocessor 20 includes a load-store unit 30, the register file 32, a floating-point computational unit 34, an integer computation unit 36, and a sequencer 38.

The register file 32 is configured to store numbers together with flag information. The numbers stored in the register file 32 can be either in a first or second format. The format used by a stored number is indicated by the flag information. The register file 32 operably communicates with the load-store unit 30, the floating-point computational unit 34, and the integer computational unit 36.

The sequencer 38 is provided to coordinate computational operations of the load-store unit 30, the floating-point computational unit 34, and the integer unit 36.

The load-store unit 30 is configured to retrieve numbers from the RAM 22 and to store the retrieved numbers in the register file 32 in the first or second format with the corresponding flag information. Further, the load-store unit 30 is configured to retrieve numbers in the first or second format together with their flag information from the register file 32 and to store the retrieved numbers in the RAM 32. As shown, the load-store unit 30 operably communicates with the RAM 22, the register file 32, and the sequencer 38.

The floating-point computational unit 34 is configured to read numbers from the register file 32 in the first and second format. Further, the floating-point computational unit 34 is configured to generate numbers in the first and second format and store them in the register file 32.

The integer unit computational unit 36 is configured to read numbers from the register file 32 in the first format. Further, the integer unit computational unit 36 is configured to generate numbers in the first format and store them in the register file 32.

In one exemplary embodiment, the first format is a 64-bit string that can be interpreted either as 64-bit double precision floating-point number as described by an IEEE 754-2008 standard or as 64-bit integer number. The second format is a special format to store subnormal single precision numbers. The second format is interpreted as a 64-bit double precision floating-point number as described by an IEEE 754-2008 standard where the integer bit is forced to zero. For purposes of understanding, the concept of a subnormal number will be explained. In particular, a subnormal number (also referred to as a "denormal number") fills a gap around zero in floating-point arithmetic and any non-zero number which is smaller than a smallest normal number is "subnormal". For example, if a smallest positive "normal" number is $1\times\beta^n$ (where $\beta$ is the base of the floating-point system, usually 2 or 10, and n is the smallest normal exponent, usually −126 for single precision and −1022 for double precision), then any smaller positive numbers that can be represented are subnormal numbers.

The floating-point computational unit 34 in the exemplary embodiment recognizes numbers in at least single and double precision, wherein all single precision numbers, except for subnormal numbers, are stored in a first format. Further, subnormal single precision numbers are stored in either the first format or a second format. Further, for all single precision numbers, the first format is the format utilized when converting the single precision number to a double precision number.

Figure 4:
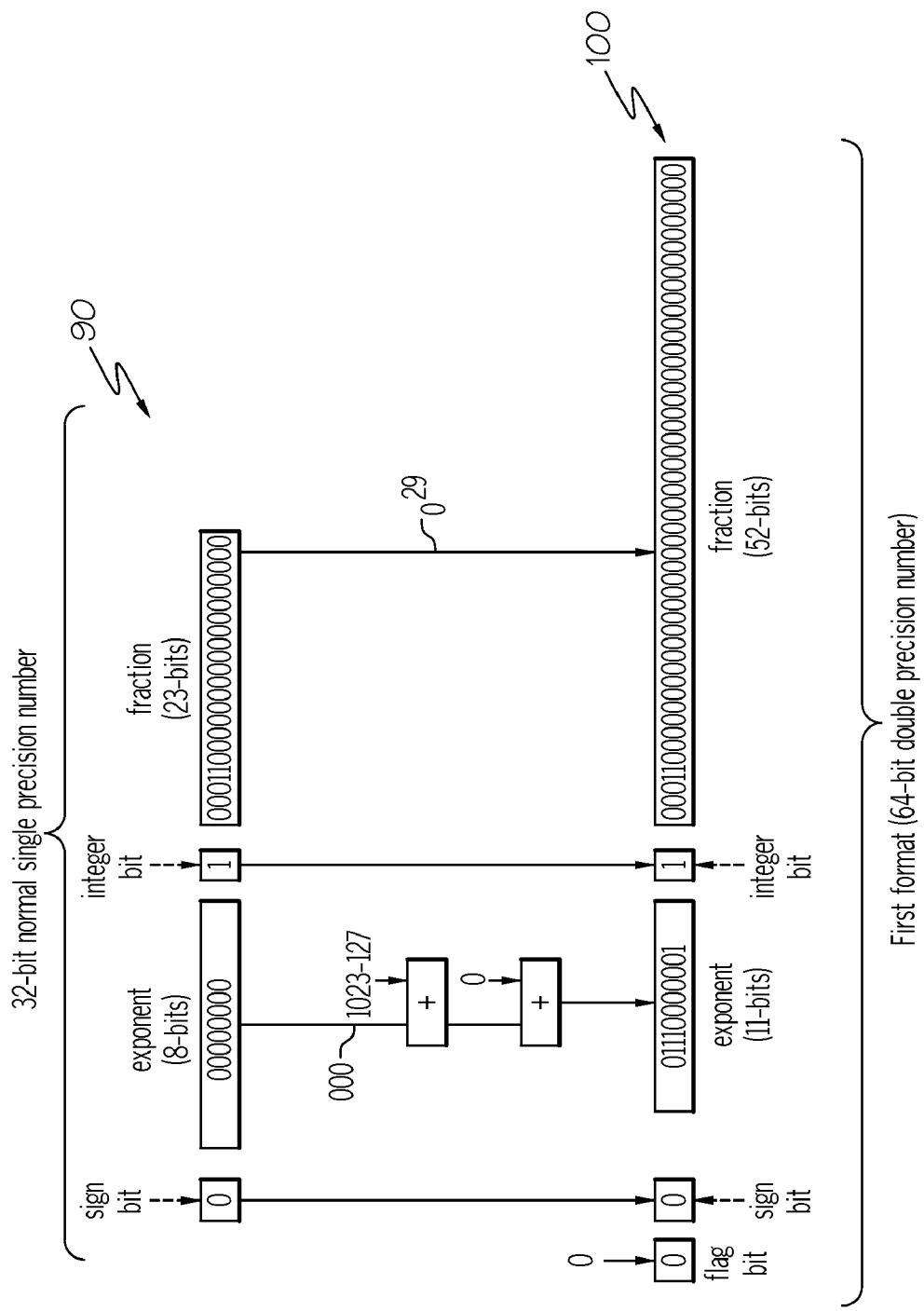
FIG. 4 is a schematic of a process for converting a normal single precision number into a double precision number in the second format.

Referring to FIG. 4, it describes a first process of converting a normal 32-bit single precision number as described by an IEEE 754-2008 standard to the first format. Such a number could be produced as an intermediate step by the load-store unit 30 or the floating-point computational unit 34. As an example, the conversion of a 32-bit normal single precision number 90 into a 64-bit double precision number 100 in the first format is shown. The single precision normal number 90 includes: (i) a sign bit "0", (ii) an 8-bit exponent "00000000", (ii) a 23-bit fraction "00011000000000000000000", and (iv) an integer bit "1" that is not stored.

During the first process, the 8-bit exponent is converted to a double precision format. In particular, the 8-bit exponent is extended to an 11-bit input exponent by appending it to "000". A first modifier is obtained by subtracting a single precision bias "127" from a double precision bias "1023" yielding "896" which corresponds to "01110000000" in binary encoding. A second modifier is set to "0". Next, the first and second modifiers are added to the 11-bit input exponent. In the example, the 8-bit exponent "00000001" is converted to an 11-bit exponent "01110000001".

Further, the 23-bit fraction is converted to a double precision format. In particular, the 23-bit fraction is appended with twenty-nine zeros to obtain a 52-bit fraction. In the example, the 23-bit fraction "00011000000000000000000" is converted to a 52-bit fraction "0001100000000000000000000000000000000000000000000000". The integer bit of "1" remains unchanged.

As a result of the first process, the 64-bit double precision number 100 is obtained which includes: (i) flag information comprising a 1-bit flag bit "0" indicating the number is in the first format, (ii) the sign bit "0", (iii) the 11-bit exponent "01101111101", (iv) the 52-bit fraction "0001100000000000000000000000000000000000000000000000", and (v) an integer bit "1" that is not stored.

Figure 2:
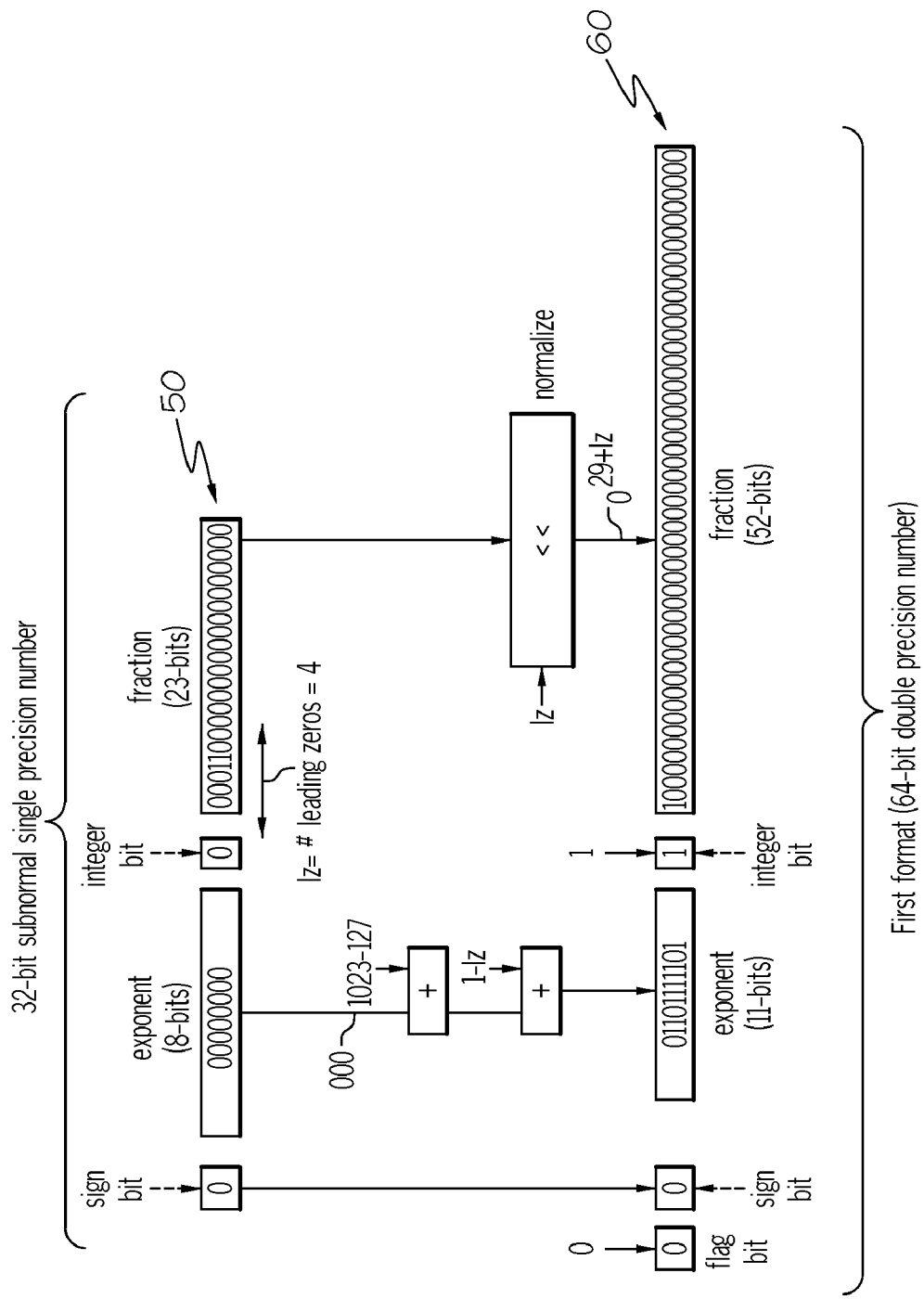
FIG. 2 is a schematic of a process for converting a subnormal single precision number into a double precision number in a first format.

Referring to FIG. 2, it describes a second process of converting a subnormal 32-bit single precision number as described by an IEEE 754-2008 standard to the first format. Such a number could be produced as an intermediate step by the load-store unit 30 or the floating-point computational unit 34. As an example, the conversion of a 32-bit subnormal single precision number 50 into a 64-bit double precision number 60 in a first format is shown. The subnormal single precision number 50 includes: (i) a sign bit "0", (ii) an 8-bit exponent "00000000", (ii) a 23-bit fraction "00011000000000000000000", and (iv) an integer bit "0" that is not stored.

During the second process, the 8-bit exponent is converted to a double precision format. In particular, the 8-bit exponent is extended to an 11-bit input exponent by appending it to "000". A first modifier is obtained by subtracting a single precision bias "127" from a double precision bias "1023". A second modifier is obtained by subtracting the number of leading zeros in the concatenation of integer bit and fraction from "1". Next, the first modifier and second modifiers are added to the 11-bit input exponent. In the example, the number of leading zeros is 4 and hence, the 8-bit exponent "00000000" is converted to an 11-bit exponent "01101111101."

Further, the 23-bit fraction is converted to a double prevision format. In particular, the 23-bit fraction is shifted by the number of leading zeros to the left and is then appended with twenty-nine zeros plus the number of leading zeros to obtain a 52-bit fraction. In the example, the 23-bit fraction "00011000000000000000000" is converted to a 52-bit fraction "1000000000000000000000000000000000000000000000000000". Further, the integer bit is set to the last bit shifted out of the 23-bit fraction that is always "1."

As a result of the second process, a 64-bit double precision number 60 is obtained which includes: (i) flag information comprising a 1-bit flag bit "0" indicating the number is in the first format, (ii) the sign bit "0", (iii) the 11-bit exponent "01101111101, (iv) the 52-bit fraction "1000000000000000000000000000000000000000000000000000", and (v) an integer bit "1" that is not stored.

Figure 3:
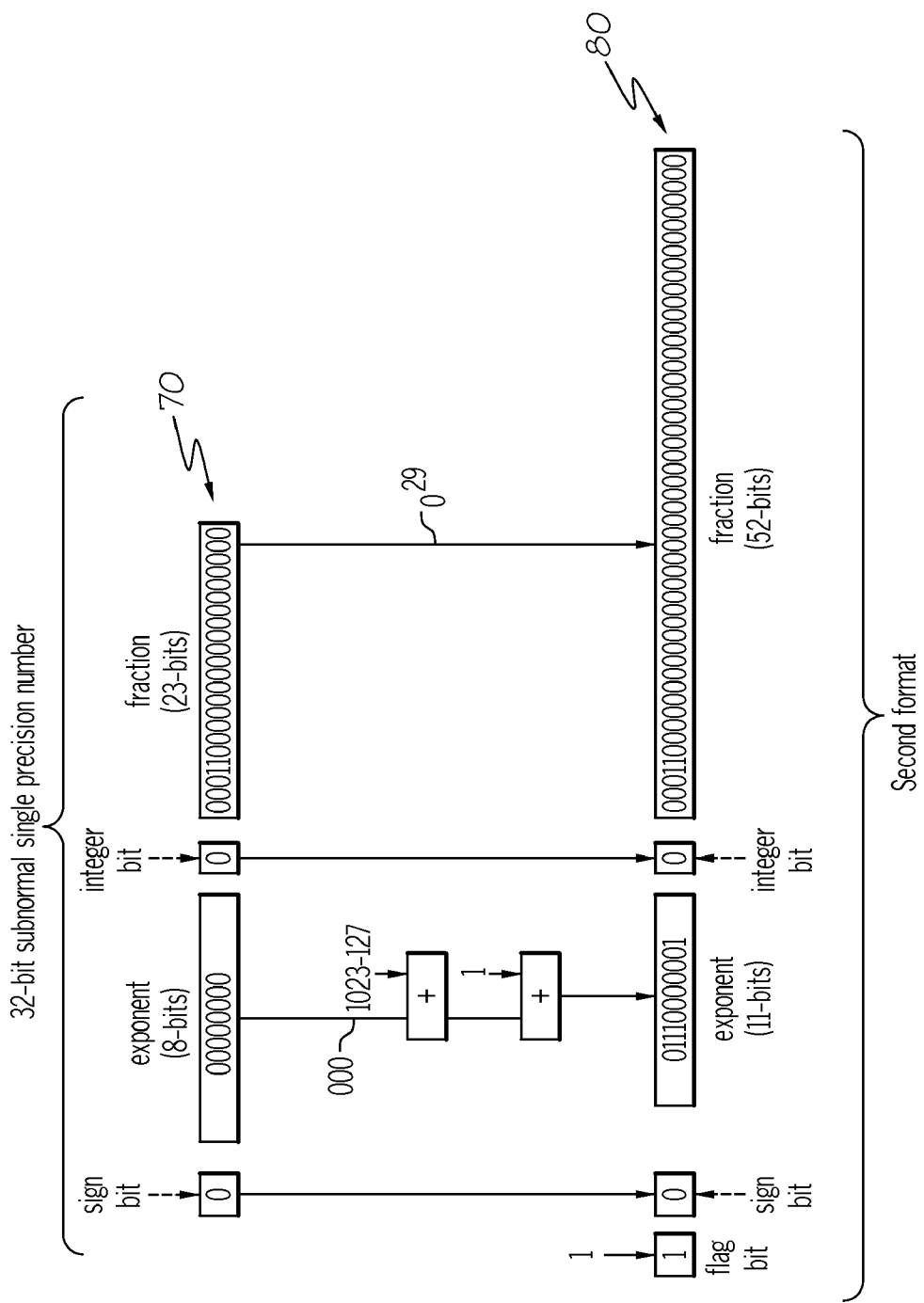
FIG. 3 is a schematic of a process for converting a subnormal single precision number into a single precision number in a first format.

Referring to FIG. 3, it describes a third process of converting a subnormal 32-bit single precision number as described by an IEEE 754-2008 standard to the second format. Such a number could be produced as an intermediate step by the load-store unit 30 or the floating-point computational unit 34. As an example, the conversion of a 32-bit subnormal single precision number 50 into a 64-bit number 80 in a second format is shown. The subnormal single precision number 50 includes: (i) a sign bit "0", (ii) an 8-bit exponent "00000000", (ii) a 23-bit fraction "00011000000000000000000", and (iv) an integer bit "0" that is not stored.

During the third process, the 8-bit exponent is converted to a double precision format. In particular, the 8-bit exponent is extended to an 11-bit input exponent by appending it to "000". A first modifier is obtained by subtracting a single precision bias "127" from a double precision bias "1023". A second modifier is set to "1". Next, the first modifier and second modifiers are added to the 11-bit input exponent. In the example, the 8-bit exponent "00000000" is converted to an 11-bit exponent "01110000001."

Further, the 23-bit fraction is converted to a double precision format. In particular, the 23-bit fraction is appended with twenty-nine zeros to obtain a 52-bit fraction. In the example, the 23-bit fraction "00011000000000000000000" is converted to a 52-bit fraction "0001100000000000000000000000000000000000000000000000". The integer bit of "0" remains unchanged.

As a result of the third process, a 64-bit number in the second format is obtained which includes: (i) flag information comprising a 1-bit flag bit "1" indicating the number is in the second format, (ii) the sign bit "0", (iii) the 11-bit exponent ""01110000001", (iv) the 52-bit fraction "0001100000000000000000000000000000000000000000000000000", and (v) an integer bit "0" that is not stored.

Referring to FIGS. 2-4, it is shown that converting normal single precision numbers to the first format and converting subnormal single precision numbers to the second format only consists of adding constants and padding vectors with constant numbers of zeros. These operations are rather simple and fast. However, converting subnormal numbers to the first format additionally consists of counting a number of leading zeros, subtracting this number, and shifting a vector by this number. Since these operations are much more complex, converting subnormal single precision numbers to the first format takes considerably more time. For performance reasons, the inventors herein have recognized that it would be advantageous to convert normal single precision numbers to the first format and subnormal single precision numbers to the second format.

Figure 5:
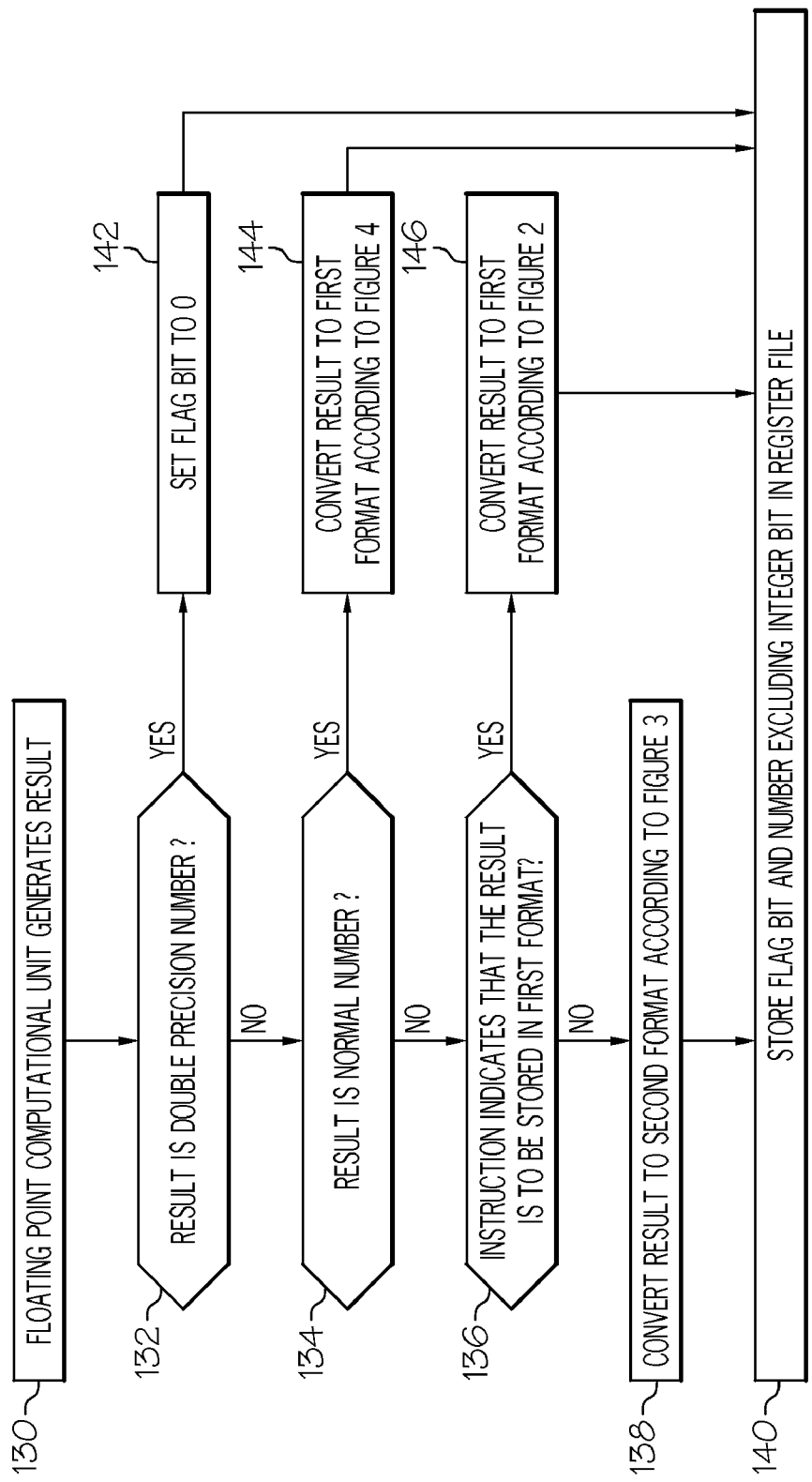
FIG. 5 is a flowchart of a method for storing numbers generated by a first computational unit in a register file in accordance with another exemplary embodiment.

Referring to FIG. 5, a flowchart of a method for storing numbers generated by a first computational unit in the register file 32 in accordance with the exemplary embodiment will now be explained.

At step 130, the floating-point computational unit 34 generates a result.

At step 132, the floating-point computational unit 34 makes a determination as to whether the result is a double precision number. If the value of step 132 equals "yes", the method advances to step 142.

At step 142, the floating-point computational unit 34 sets a flag bit equal to "0" indicating that the result is a double precision number and hence already in the first format. After step 142, the method advances to step 140. If the value of step 132 equals "no", the method advances to step 134.

At step 134, the floating-point computational unit 34 makes a determination as to whether the result is a normal single precision number. If the value of step 134 equals "yes", the method advances to step 144.

At step 144, the floating-point computational unit 34 converts the result to the first format utilizing the exemplary methodology described in FIG. 4. It should be noted that the 32-bit normal single precision number of FIG. 4 is merely exemplary and that any 32-bit normal single precision number could be converted to the first format in step 134. After step 144, the method advances to step 140. If the value of step 134 equals "no", the method advances to step 136.

At step 136, the floating-point computational unit 34 makes a determination as to whether an instruction indicates that a result is to be stored in the first format. If the value of step 136 equals "yes", the method advances to step 146.

At step 146, the floating-point computational unit 34 converts the result to the first format utilizing the exemplary methodology described in FIG. 2. It should be noted that the 32-bit subnormal single precision number of FIG. 2 is merely exemplary and that any 32-bit subnormal single precision number could be converted to the first format in step 146. After step 146, the method advances to step 140.

At step 138, the floating-point computational unit 34 converts the result to the second format utilizing the exemplary methodology described in FIG. 3. It should be noted that the 32-bit single precision number of FIG. 3 is merely exemplary and that any 32-bit subnormal single precision number could be converted to the second format in step 138. After step 138, the method advances to step 140.

At step 140, the floating-point computational unit 34 stores the flag bit and number excluding the integer bit in the register file 32. After step 140, the method is exited.

Figure 6:
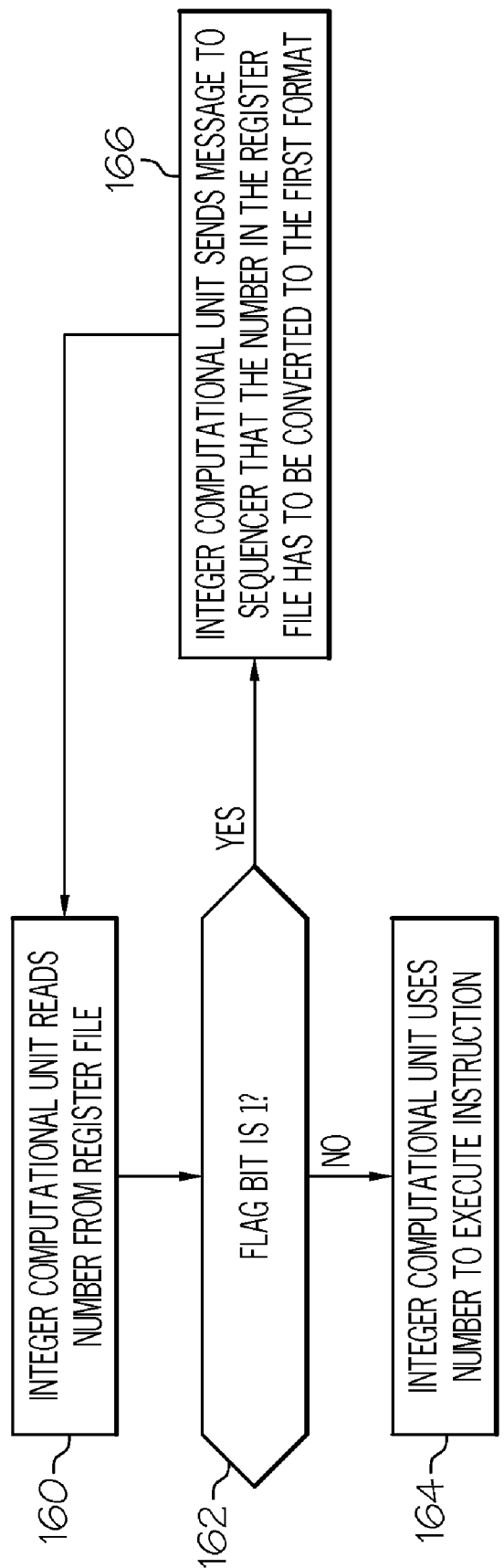
FIG. 6 is a flowchart of a method for reading numbers from the register file by a second computational unit in accordance with another exemplary embodiment.

Referring to FIG. 6, a flowchart of a method for reading numbers from the register file by a second computational unit that in accordance with the exemplary embodiment will be described. The method ensures that the second computational unit always reads the correct data, even if it has no knowledge of the second format.

At step 160, the integer computational unit 36 reads a number from the register file 32.

At step 162, the integer computational unit 36 makes a determination as to whether the flag bit in the number is equal to "1." If the value of step 162 equals "yes", the method advances to step 166.

At step 166, the integer computational unit 36 sends a message to the sequencer 38 indicating that the number in the register file has to be converted to the first format. After step 166, the method returns to step 160. If the value of step 162 equals "no", the method advances to step 164.

At step 164, the integer computational unit 36 uses the number to execute an instruction. After step 164, the method is exited.

The above-described method can be at least partially embodied in the form of one or more computer readable media having computer-executable instructions for practicing the methods. The computer-readable media can comprise one or more of the following: hard drives, flash memory, and other computer-readable media known to those skilled in the art; wherein, when the computer-executable instructions are loaded into and executed by one or more microprocessor, the one or more microprocessors become an apparatus for practicing the invention.

The system and the method for storing numbers in a register file represent a substantial advantage over other systems and methods. In particular, the system and the method provide a technical effect of storing numbers having first and second formats in a register file.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A system for storing numbers in first and second formats, comprising:
    a register file;
    a first computational unit operably communicating with the register file, the first computational unit configured to generate a first number having first flag information indicating that the first number is in the first format and to store the first number in the register file, the first computational unit further configured to generate a second number having second flag information indicating that the second number is in the second format and to store the second number in the register file; and a second computational unit operably communicating with the register file, the second computational unit configured to perform operations utilizing numbers in the first format and not configured to perform operations utilizing numbers in the second format, the second computational unit is further configured to read a third number and third flag information from the register file and to use the third flag information to determine whether the third number is in the first format or the second format;

wherein the first computational unit recognizes numbers in at least first and second precisions, wherein all numbers, except for subnormal numbers having a smaller precision of the first and second precisions, are stored in the first format, and wherein subnormal numbers having the smaller precision of the first and second precisions are stored in either the first format or the second format.

2. The system of claim 1, wherein the first flag information, second flag information, and third flag information each comprise a 1-bit flag that is stored in the register file.

3. The system of claim 1, wherein the first computational unit is either a binary floating-point unit or a load-store unit.

4. The system of claim 1, wherein the first and second precisions are at least one of double precision and single precision.

5. The system of claim 4, wherein the first format is a format defined by an architecture of the system.

6. The system of claim 5, wherein for all double precision numbers, the first format is a format as described by an IEEE 754-2008 standard for 64 bit binary floating-point data, and wherein for all single precision numbers, the first format is a format utilized when converting the single precision number to a double precision number using the IEEE 754-2008 standard for 64 bit binary floating-point data to represent the double precision number.

7. The system of claim 6, wherein the second format is a format utilized when taking a sign, an exponent, and a fraction used in the IEEE 754-2008 standard for 32 bit binary floating-point data to represent a subnormal single precision number, and modifying the 32 bit binary floating-point data such that:

the sign bit is left unmodified, the exponent is incremented by one and is represented in double precision format by extending a width to 11 bits, subtracting a single precision bias of 127 and adding a double precision bias of 1023, and the fraction is padded with 29 zeros at a least significant bit side.

8. The system of claim 7, wherein an operational instruction utilized by the first computational unit determines whether a number is to have the first format or the second format.

9. The system of claim 8, wherein when the second computational unit reads data in the second format, the second computational unit sends a message requesting the data in the second format be converted to data in the first format.

10. The system of claim 9, wherein the second computational unit is at least one of a fixed point unit, a permute unit, and a decimal floating-point unit.

11. A method for storing numbers in first and second formats, comprising:

generating a first number having first flag information indicating that the first number is in the first format and storing the first number in the register file, utilizing a first computational unit;

generating a second number having second flag information indicating that the second number is in the second format and storing the second number in the register file, utilizing the first computational unit;

performing operations utilizing numbers in the first format and not performing operations utilizing numbers in the second format, utilizing a second computational unit; and reading a third number and third flag information from the register file utilizing the second computational unit and using the third flag information to determine whether the third number is in the first format or the second; and based on the third number being in the second format, sending by the second computational unit a message requesting the third number in the second format be converted to the first format.

12. The method of claim 11, wherein the first computational unit is either a binary floating-point unit or a load-store unit.

13. The method of claim 12, wherein the first format is a format defined by an architecture of a system.

14. The method of claim 13, wherein for all double precision numbers, the first format is a format as described by an IEEE 754-2008 standard for 64 bit binary floating-point data, and wherein for all single precision numbers, the first format is a format utilized when converting the single precision number to a double precision number using the IEEE 754-2008 standard for 64 bit binary floating-point data to represent the double precision number.

15. The method of claim 14, wherein the second format is a format utilized when taking a sign, an exponent, and a fraction used in the IEEE 754-2008 standard for 32 bit binary floating-point data to represent a subnormal single precision number, and modifying the 32 bit binary floating-point data such that:

the sign bit is left unmodified, the exponent is incremented by one and is represented in double precision format by extending a width to 11 bits, subtracting a single precision bias of 127 and adding a double precision bias of 1023, and the fraction is padded with 29 zeros at a least significant bit side.

16. The method of claim 15, further comprising determining whether the first number is to have the first format or the second format utilizing an operational instruction utilized by the first computational unit.

17. The method of claim 16, wherein the message is sent to a sequencer by the second computational unit.

18. The method of claim 17, wherein the second computational unit is at least one of a fixed point unit, a permute unit, and a decimal floating-point unit.

19. The method of claim 11, wherein the first flag information, second flag information, and third flag information each comprise a 1-bit flag that is stored in the register file.

20. A microprocesor comprising:

a register file;

a floating point computational unit;

an integer computational unit; and a sequencer, the microprocessor configured to perform a method comprising:

generating a result by the floating point computational unit;

based on determining by the floating point computational unit that the result is in a first format, the first format comprising a double precision format, storing the result in the register file and setting a flag bit in the register file to indicate that the stored result is in the first format;
based on determining by the floating point computational unit that the result is a normal single precision number, converting the result into the first format, storing the converted result in the register file, and setting the flag bit in the register file to indicate that the stored result is in the first format;
based on determining by the floating point computational unit that the result is a subnormal single precision number, converting the result into a second format, storing the converted result in the register file, and setting the flag bit in the register file to indicate that the stored result is in the second format;
reading, by the integer computational unit, the stored result and the flag bit from the register file;
based on the flag bit indicating that the stored result is in the first format, using the stored result to execute an instruction by the integer computational unit; and
based on the flag bit indicating that the stored result is in the second format, sending a message by the integer computational unit to the sequencer to convert the stored result to the first format.

* * * * *